United States Patent
Walker (10) Patent No.: US 6,295,962 B1
(45) Date of Patent: Oct. 2, 2001

(54) CRANKSHAFT AND PISTON ARRANGEMENT

(75) Inventor: Patrick Michael Cranston Walker, Banbury (GB)

(73) Assignee: Naxsym Engine Technology Ltd., Bransbury (GB)

( * ) Notice: Subject to any disclaimer, the term of this patent is extended or adjusted under 35 U.S.C. 154(b) by 0 days.

(21) Appl. No.: 09/155,626

(22) PCT Filed: Mar. 27, 1997

(86) PCT No.: PCT/GB97/00867

§ 371 Date: Feb. 9, 1999

§ 102(e) Date: Feb. 9, 1999

(87) PCT Pub. No.: WO97/37151

PCT Pub. Date: Oct. 9, 1997

(30) Foreign Application Priority Data

Apr. 2, 1996 (GB) .................................................. 9606982

(51) Int. Cl.$^7$ .................................................. F02B 75/06
(52) U.S. Cl. .............................. 123/192.2; 74/590; 74/603
(58) Field of Search ............................. 123/192.2, 192.1; 74/590, 603, 604

(56) References Cited

U.S. PATENT DOCUMENTS

| | | | |
|---|---|---|---|
| 1,310,090 | * 7/1919 | Ricardo | .................................. 74/604 |
| 3,112,658 | * 12/1963 | Berlyn | .................................. 74/603 |
| 4,407,169 | * 10/1983 | Menen | .................................. 74/604 |
| 4,481,918 | * 11/1984 | Morton | .................................. 123/192.2 |
| 5,282,397 | * 2/1994 | Harkness et al. | .................................. 74/603 |

FOREIGN PATENT DOCUMENTS 30 33 803 A1 * 4/1982 (DE).
31 37 933 A1 * 4/1983 (DE).

* cited by examiner

Primary Examiner—Noah P. Kamen
(74) Attorney, Agent, or Firm—Wood, Phillips, VanSanten, Clark & Mortimer (57) ABSTRACT

A crankshaft and piston arrangement for a combustion engine including a piston pivotally connected to a crankshaft by a connecting rod and two balance structures each including a balance structure connecting rod connected to the crankshaft and a balance arm having a longitudinal axis and pivotally connected to the balance structure connecting rod. The balance arm is pivotally connectable at an end remote from the balance structure connecting rod to the engine. The longitudinal axes of the balance arms extend in substantially opposite directions to one another and are substantially perpendicular to a plane through the crankshaft rotational axis (C) and center of the piston when the piston is at substantially mid-stroke and rotate in opposite directions to one another in use. Each balance structure is substantially diametrically opposed to a piston with respect to the crankshaft rotational axis thereby operably to balance forces generated by the acceleration and deceleration of the piston in use. The L/R ratios for the piston connecting rod and the balance structure connecting rod are substantially equal.

43 Claims, 9 Drawing Sheets

CRANKSHAFT AND PISTON ARRANGEMENT

The invention relates to a crankshaft and piston arrangement for a combustion engine. In particular, the invention relates to means for balancing such an arrangement especially in a single cylinder or parallel twin cylinder engine.

GB 2057061 teaches the use of a balancing link pivotally connected to a crankshaft at a point diametrically opposed to the big end of the connecting rod to a piston. The balancing link is pivotally connected at its end opposite to the crankshaft to a guide link which is pivotally connected at a fixed point on the engine. GB 2057061 teaches that certain relationships between the length of the connecting rod, the separation of the big end thereof and the centre of rotation of the crankshaft, the separation of the crankshaft pivot point of the balancing link and the centre of the crankshaft, and the separation of the pivots on the balancing link must be met. In particular, that patent specification states that the mutual pivot point of the balancing link and guide link should be positioned at the centre of percussion of the balancing link, which pivot point therefore has a fixed position in relation to the centre of gravity of the balancing link as described in the earlier patent. However, the cost of manufacture of the engine described in GB 2057061 is relatively expensive due to the construction of the additional pivot link and guide link. Moreover, it is not found to provide sufficient reduction in engine vibration to enable high speed of revolution of the crankshaft and/or relatively smooth operation thereof at moderate speeds of revolution.

Accordingly, an object of the invention is to avoid or at least mitigate the problems of the prior art. An object is therefore to provide a well balanced engine. A first aspect of the invention provides a crankshaft and piston arrangement for a combustion engine, comprising a piston pivotally connected to a crankshaft by a connecting rod, and balance means comprising a connecting rod and a balance arm pivotally connected thereto, the balance arm being connectable at an end remote from the connection rod to the engine and wherein the balance arm provides a balance mass. Preferably this mass is substantially provided in the region of the balance means connecting rod thus to produce a force substantially equal in magnitude to the force generated by the motion of the piston. The balance means is preferably substantially diametrically opposed to the piston and connecting rod in one preferred form, or provided on the same side of the crankshaft as the piston in another.

Beneficially, the connecting rod for the balance means can be substantially identical to the connecting rod for the piston.

Beneficially, the balance arm can provide a force equal in magnitude but opposite in direction to the force generated by the accelerations and decelerations of the piston.

Preferably, the balance arm comprises a relatively massive end which end is pivotally connected to the balance means connecting rod. The massive end of the balance arm can be separated into two regions (or forked) such that the end of the balance means connecting rod is engaged between the massive forked end of the balance arm. Further, the centre of rotation of the pivot between the balance arm and balance means connecting rod can be centrally disposed in the massive end of the connecting arm.

In a preferred form, the arrangement comprises two parallel pistons each connected by a connecting rod and bearing to the crankshaft. Preferably, a balance arm is provided for each piston. More preferably, the balance arms extend in substantially opposite directions to one another away from their respective connecting rods.

In one form, the connecting rods of the balance means for a twin piston engine share a co-axial axis of rotation on the crankshaft. Also, the connecting rods can be angularly displaced with respect to one another. The degree of angular displacement is preferably less than or equal to 10° and more preferably in the order of 3° when the pistons are radially outermost.

In another form a single piston arrangement is provided having two balance means each having a balance arm, which arms extend in substantially opposite directions to one another away from the crankshaft. In such an arrangement, preferably a series of four crankshaft webs are used to enable connection in series of a balance means, a piston connection rod and a second balance means to the crankshaft.

In a further preferred form, when the piston is radially outermost an angle is presented between the central axis of the piston and the longitudinal axis of the balance arm which is preferably in the order of or less than 90°. More preferably, the angle is greater than 45° and can be in the order of 50 to 75°. When the piston is in a central position of the overall stroke of the piston, preferably the balance arm or arms are horizontal, or present substantially a right angle between the longitudinal axis of the balance arm and the axis between the balance arm pivot with the connecting rod and the centre of rotation of the crankshaft.

The balance means and pistons can be in any order along the crankshaft. However, in a further preferred form of the invention, the crankshaft comprises in axial order a first piston, two balance means and a second piston arranged along the crankshaft. Preferably, each of the pistons and balance means is separated from its neighbour by a crank web to which each is pivotally connected by a bearing. Preferably, a central main bearing is disposed centrally along the axis of the crankshaft symmetrically between two pairs each comprising one of the pistons and one of the balance means.

In another preferred arrangement the balance means is provided on the same side of the crankshaft as the piston, this provides the benefit of a reduction in the overall size of the crankshaft and piston arrangement. The length of the balance means connecting rod is preferably shorter in this arrangement than the piston connecting rod in order to allow for movement of the piston. Accordingly, the connecting rod lengths and the stroke of the piston and balance means can be adjusted in order to maintain an equal L/R ratio for the balance means and piston connecting rod, or to achieve the desired L/R for the balance means. Where L is the length of the connecting rod and R (the throw) is half the stroke of the piston or balance means.

According to a second aspect of the invention there is provided a crankshaft and piston arrangement for combustion engines comprising two pistons each pivotally connected to a crankshaft by an associated connecting rod, and a pair of balance means comprising a guided balance mass to reduce the vibrations created by movement of the pistons in use, the arrangement further comprising a central main bearing. Beneficially this inhibits crankshaft bending and so avoids out of balance forces. Preferably the balance means are connected on opposite sides of the central main bearing which in turn are connected to crankshaft webs connected to the piston connecting rods.

In this arrangement, the balance means can comprise a balance mass pivotally connected to the crankshaft wherein the balance mass is guided by a relatively less massive link pivotally attachable to a fixed point in an engine in use. Alternatively the arrangement of the first aspect of the invention can be used each having a central main bearing.

According to a third aspect of the invention, there is provided an engine having a crankshaft and piston arrangement for combustion engines comprising a piston pivotally connected to a crankshaft by a connecting rod and balance means comprising a balance mass pivotally connected to the crankshaft and a guide link pivotally connected to the balance mass and connectable at an end remote from the balance mass to a fixed point on the engine, wherein the guide link for the balance means is connected to the engine on the same side of the crankshaft as the piston. Beneficially the balance means is therefore clear of the engine oil sump and a reduced overall engine size can be achieved. Features of the other aspects of the invention such as use of two pistons, two balance means for one piston, or a central main bearing for example can be used in combination of this aspect of the invention.

A yet further aspect of the invention provides a balance arm for a balanced crankshaft and piston arrangement for a combustion engine comprising a minor end connected by a connecting arm to a massive end adapted to engage a connecting rod for connection to a crankshaft arrangement. Preferably means for communicating lubricating fluid to the bearing between the balance arm and connecting rod is provided. Also, an extension to the minor end can be provided for actuating a pump or compressor for example. Further, the massive end can comprise a region of dense material which enables the centre of mass of that end to be disposed, with respect to the minor end, beyond the pivot axis for the connecting rod.

Embodiments of the invention will now be described, by way of example only, with reference to the accompanying drawings in which.

Figure 1:
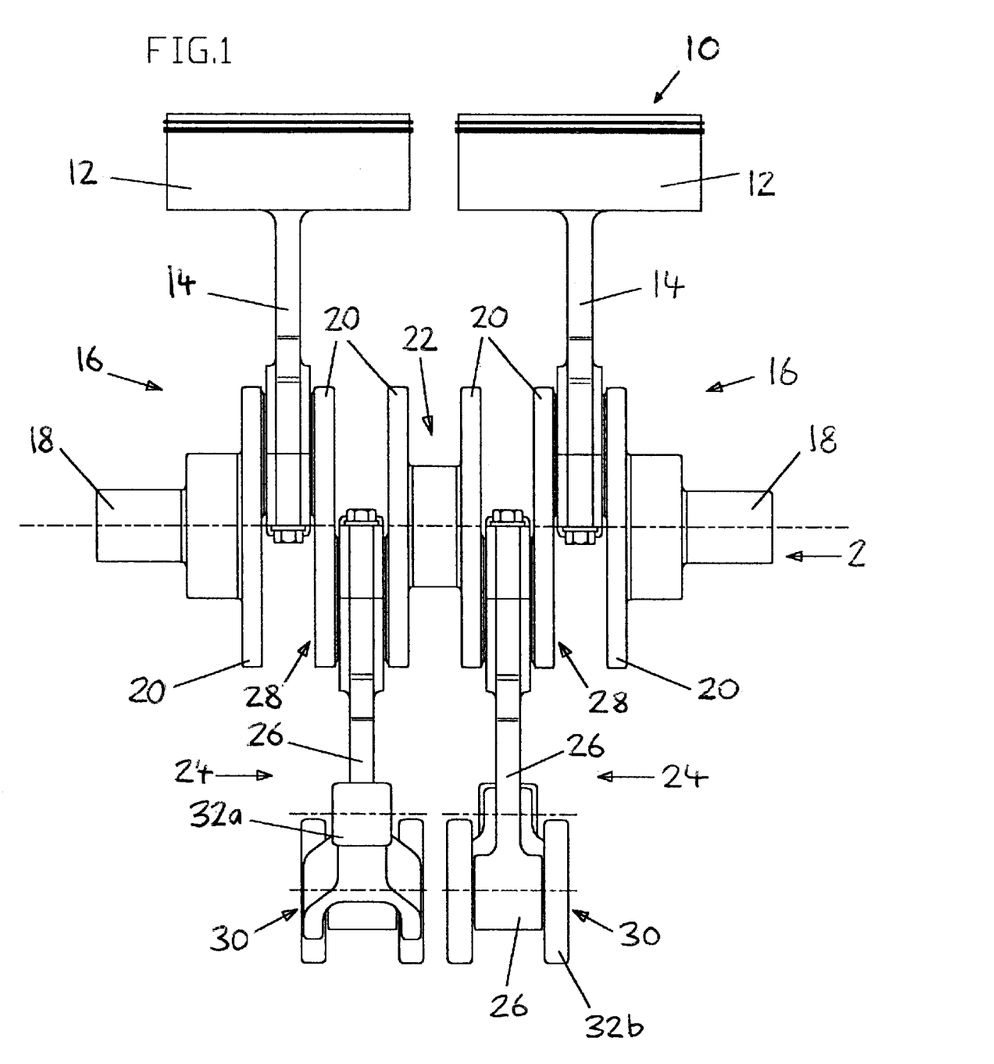
FIG. 1 is a side elevation view of a first embodiment of a crankshaft and twin piston arrangement according to the invention.

Referring to FIG. 1 there is shown a piston and crankshaft arrangement 10 according to the invention comprising a pair of pistons 12 which are arranged parallel to one another at axially displaced positions along a crankshaft 18. Each piston 12 is connected to the crankshaft 18 by a connecting rod 14 which is pivotally mounted to a pair of crank webs 20 at a bearing 16. A central main bearing 22 is provided between a pair of crank webs 20 in the centre of the arrangement as shown in FIG. 1. Additionally, the arrangement 10 comprises a pair of balancing means 24 disposed on each side of the main bearing 22. Each balance means 24 comprises a connecting rod 26 pivotally attached to a pair of crank webs 20 at a bearing 28. The end of each connecting rod 26 remote from the crankshaft 18 is connected at a bearing 30 to a balance arm 32.

Figure 2:
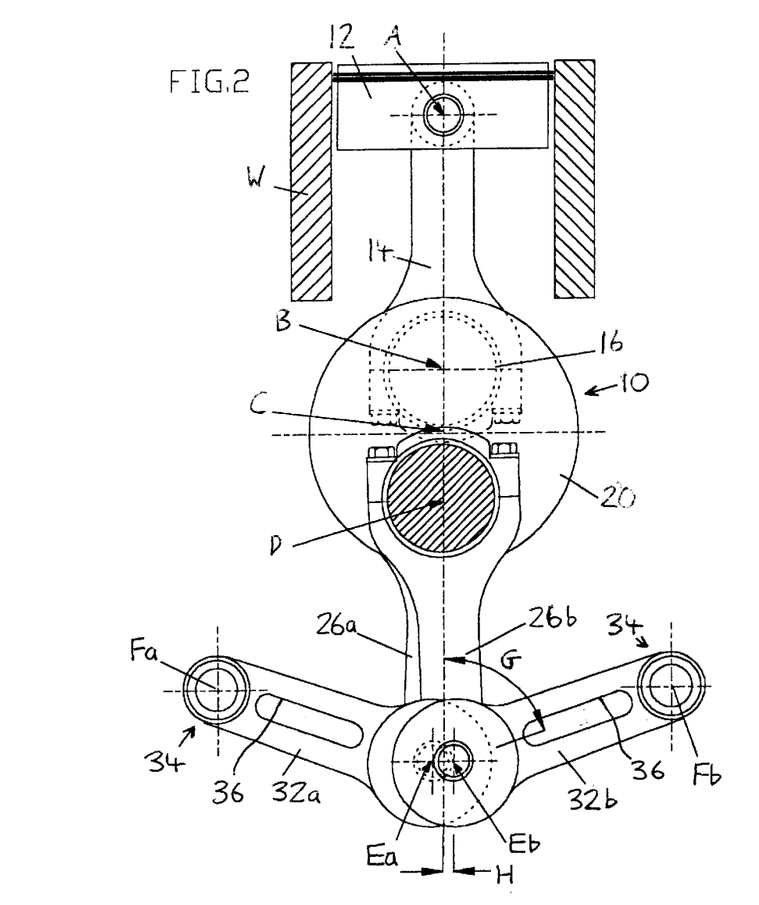
FIGS. 2 and 3 are end elevation views at different points in the stroke of the arrangement shown in FIG. 1.
Figure 3:
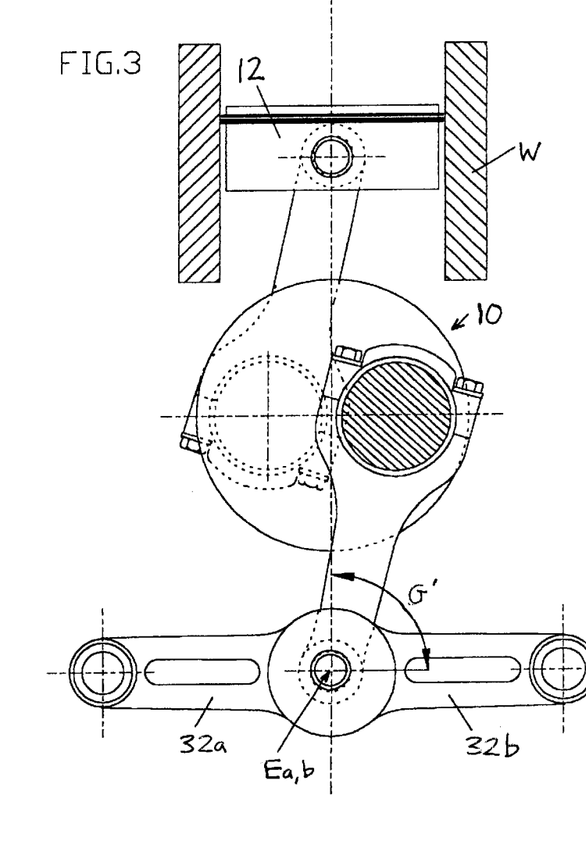
Figure 4:
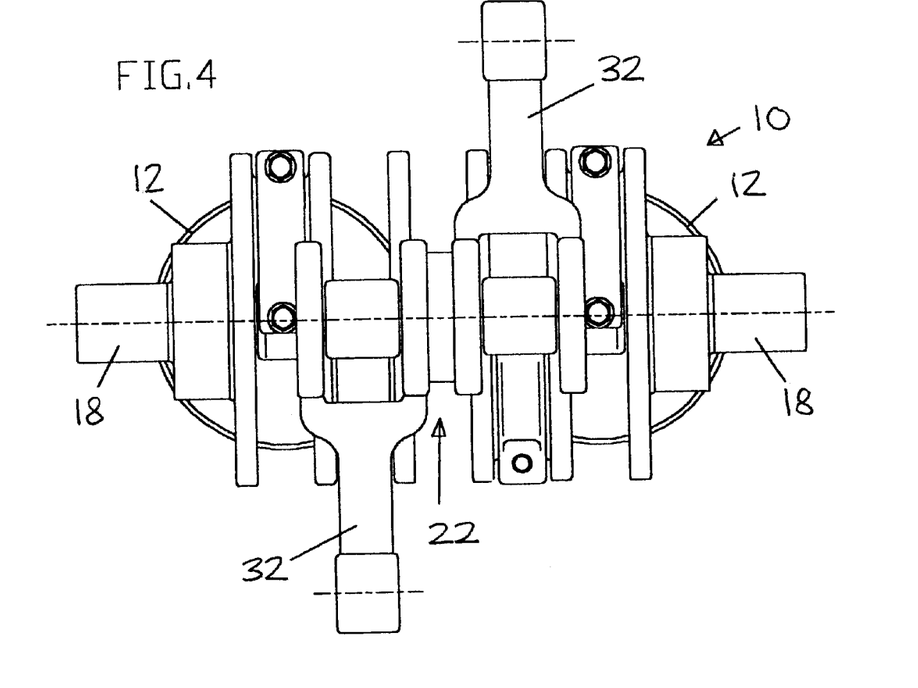
FIG. 4 is a plan elevation view from beneath of the arrangement shown in FIGS. 1, 2 and 3.

Referring to FIGS. 2, 3 and 4, it can be seen that the balance arms 32a and 32b are preferably substantially identical and preferably extend away from their respective connecting rod 26 in substantially opposite directions. Each balance arm 32 is connected to the crankcase (or a fixed point) at a bearing 34 to allow pivotal movement thereof as can be seen by comparison of FIGS. 2 and 3. These figures show schematically a section through a cylinder wall W wherein a piston 12 is shown in an uppermost position within its stroke, i.e. where pivot axis B at bearing 16 with crankshaft 18 is uppermost, and an approximately mid-stroke position in which axis B is horizontally in line with the central longitudinal axis C of the crankshaft 18.

In the arrangement shown in FIGS. 1 to 4, the positions of the axes of rotation F ($F_a, F_b$) of pivot 34 are preferably disposed vertically higher an the axes of rotation E ($E_a, E_b$) between the balance arms 32 and connecting rods 26 when the pistons are in the positions shown in FIG. 2. An angle G can be defined between the longitudinal axis of the balance arm 32 and an axis rung through points A and C shown in FIG. 2, in other words a central axis of the piston. This angle is in the order of 75° when the piston is uppermost in its stroke. Angle G' can be seen to have increased at the mid-stroke position shown in FIG. 3 wherein G' is approximately 90°. Naturally, at the lowermost position at the bottom of the stroke of piston 12, angle G is in the order of 105°. Ideally the balance arms 32 are as long as possible in order to keep angle G as close to 90° as possible throughout the stroke of the piston. Nevertheless, the embodiment shown in FIGS. 1 to 4 is found to provide excellent reduction in vibrations and has the benefit of compactness. In the preferred form, axis F is positioned halfway down the stroke of the balance rod 26, thereby providing the arrangement shown in FIG. 3.

Referring to FIG. 2 it can be seen that preferably connecting rods 26a and 26b of the balancing means share the same axis of rotation D at the crankshaft but the connecting rods are angularly displaced by an angle H. The angle is ideally close to zero and preferably in the order of 3° in the configuration shown in FIG. 2. It can also be seen in FIG. 2, that the balance arms 32 preferably comprise recess portions 36. Greater detail of the preferred form of balance arms 32 is given in FIGS. 5 and 6.

Figure 5:
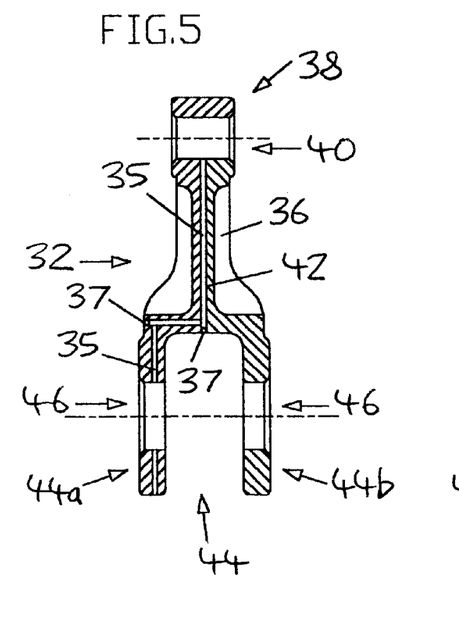
FIGS. 5 and 6 are views of a balance arm according to the invention.
Figure 6:
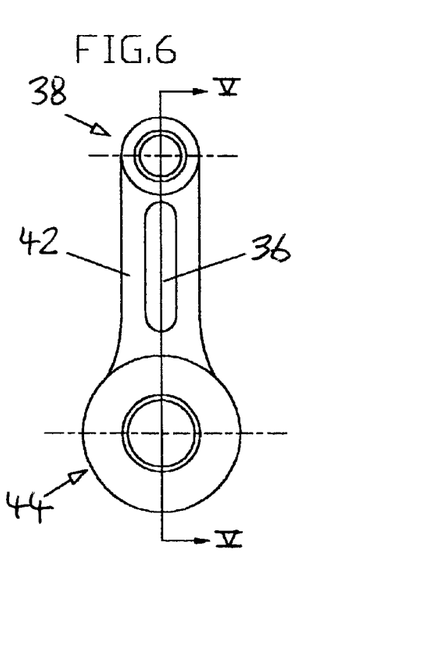

Referring to FIGS. 5 and 6, the balance arm 32 comprises a minor end 38 having an aperture 40 which connects to bearing 34. An arm 42 extends between minor end 38 and massive end 44. Arm 42 comprises a recessed region 36 in order to provide structural rigidity for minimum weight in this region. Massive end 44 is forked to provide two arms 44a and 44b. Each arm comprises an aperture 46 for engaging a bearing 30 thereby enabling connection to connecting rod 26.

Also shown in FIG. 5 is an oil way for communicating lubricant to the apertures 46 in massive end 44. The oil way comprises drillings 35 and plugs 37 which cooperate to guide lubricant from aperture 40 in minor end 38 through arm 42 to massive end 44.

Figure 7:
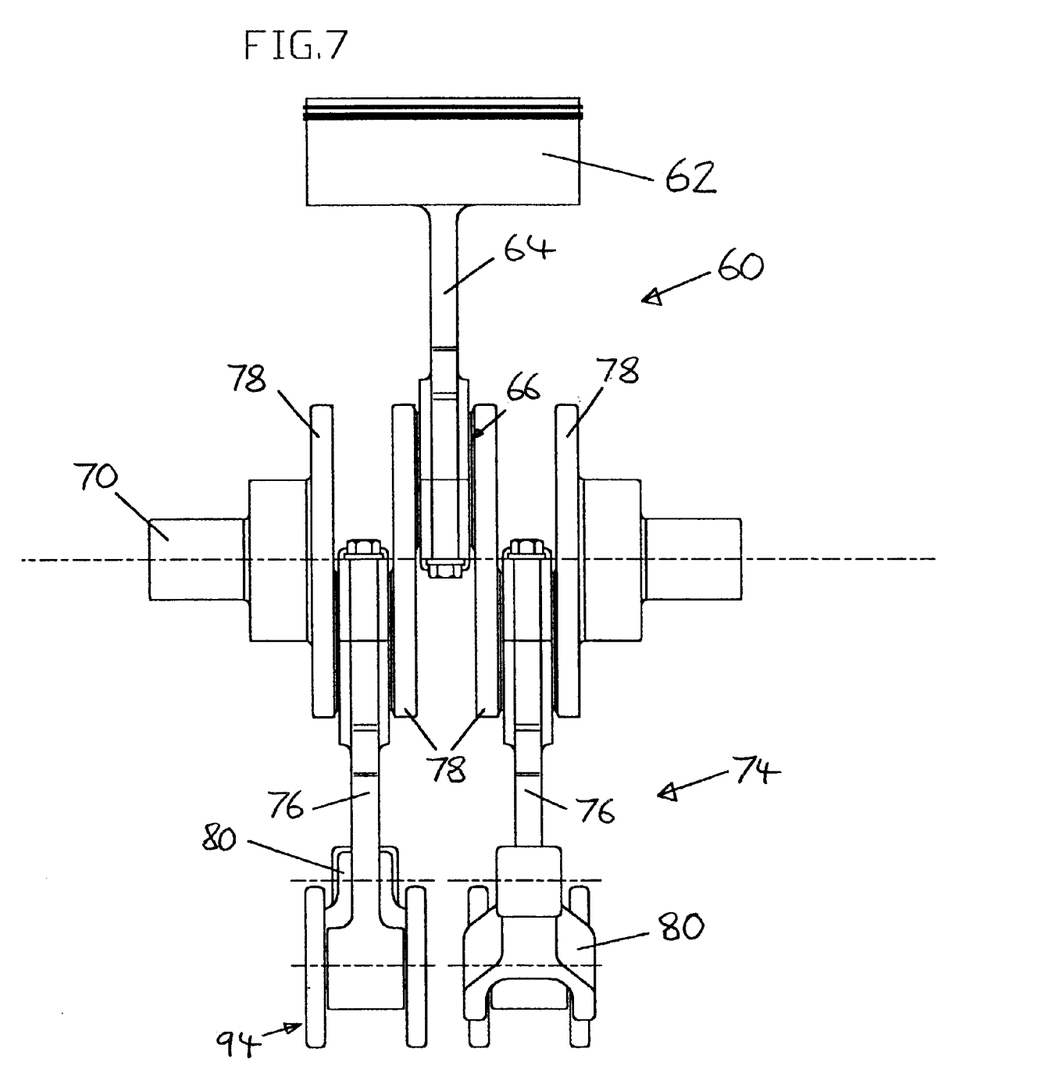
FIGS. 7 is a side elevation view of a second embodiment of a crankshaft and piston arrangement for a single cylinder engine according to the invention.

Referring to FIG. 7, there is shown a second arrangement according the invention wherein the crankshaft and piston arrangement 60 shown, comprise a single piston 62.

The piston 62 is connected via a connecting rod 64 to a crank 70 via bearing 66. Four crank webs 78 are disposed along crankshaft 70. A pair of balance means 74 is also provided such that the end elevation view of arrangement 60 is identical to that shown in FIGS. 2 and 3 for the twin-piston arrangement. Arrangement 60 is configured as shown in FIG. 7 where a web plate 78 is disposed on each side of a connecting rod 76 of each of the balance means. The axially centermost pair of web plates 78 are connected to the connecting rod 64 of piston 62. The balance means comprises a pair of connecting rods 76 which can be substantially identical to connecting rod 64. Further, balance means 74 comprises a pair of balancing arms 80 pivotally connected at their massive end 94 to one end of connecting rod 76 and to a point at the opposite end thereof at axis F in a minor end 88 (not shown). Preferably angle G shown in FIG. 2 for the twin cylinder arrangement is in the order of 50° here. As can be seen in FIG. 7 the connecting rods 76 and 64 may be substantially identical.

Beneficially, in the arrangements described above, the ratio of the length (L) between axes A and B (distance between centres of connecting rod 14), see FIG. 2, to the distance (R) between the axes B and C of the piston connecting rod and crankshaft (or crankshaft throw) can be in the order of 3.5, and preferably is in the range of 2.5 to 4.5 and more preferably 3 to 4. The same L/R ratio is possible for the balance means shown, where L is the distance between axes E and D, and R is the distance between the axes C and D. Because of the excellent balance characteristics of the engine it is possible to minimise the L/R ratios and therefore minimise the overall height of an engine. Additionally, it is possible to reduce the overall height of the engine by maintaining equal L/R ratios for the piston and balance means but use balance means connecting rods 26 of shorter length than the main connecting rods 14. The connecting rods 26 can be pivotally attached to the crankshaft at a smaller throw than the piston. In other words, the distance D to C shown in FIG. 2 could be in the order of 0.2 to 1 times the distance C to B for the piston. Where the throws are not equal, the mass of the massive end of the balance arm 32 is preferably adjusted accordingly and for example if the balance means throw is half that of the piston then the rotational inertia of the balance arm 32 should be doubled.

In a preferred form of the invention, the balance means 24 or 74 comprise a connecting rod substantially identical to that connected to the piston.

A farther benefit of the arrangement shown in FIGS. 1 to 4 is that the central main bearing 22 in combination with the balance means 24 provides stability of crankshaft 18 thereby to prohibit flexing of the crankshaft about the various bearings. Any such flexing would allow the motions of the various components to become distorted and produce vibration.

Beneficially a parallel twin cylinder engine according the invention provides a size, weight and cost benefit over known systems. Additionally, a high level of balance is achieved which enables very high speeds of revolution of crankshaft 18. A twin cylinder engine according to the invention enables use of the engine instead of a four cylinder engine in certain applications.

Figure 8:
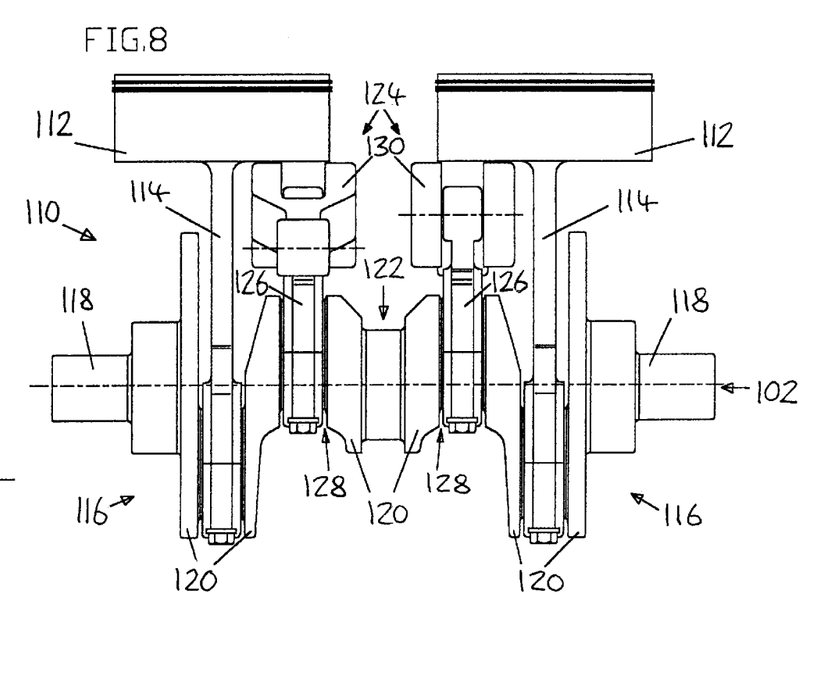
FIG. 8 is a side elevation view of a third embodiment of a crankshaft and twin-piston arrangement according to the invention.
Figure 9:
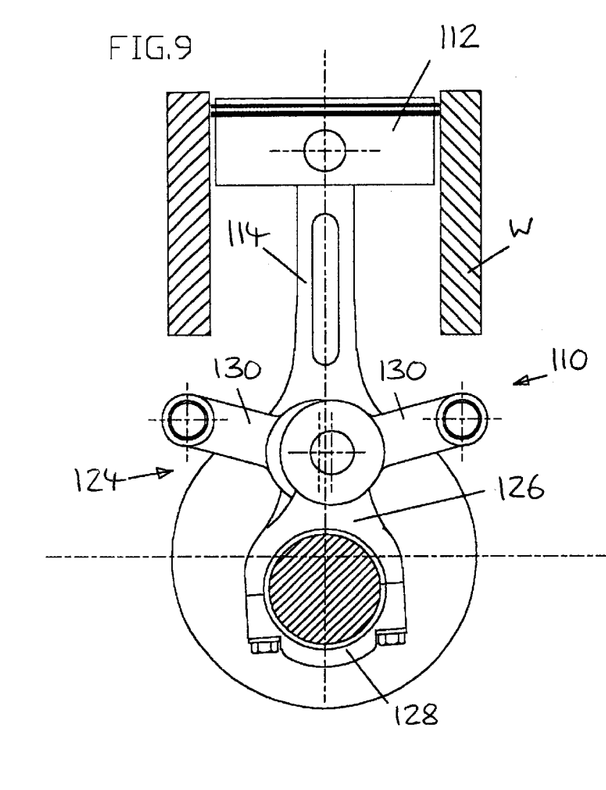
FIG. 9 is an end elevation view of the arrangement shown in FIG. 8.

Referring to FIGS. 8 and 9 there is shown a further embodiment of a crankshaft and piston arrangement 110 according to the invention. In this embodiment of a twin piston arrangement, balance means 124 are provided on the same side of crankshaft 118 as pistons 112. In other respects the embodiment is similar to that shown in FIGS. 1 to 4 and accordingly the same two digits reference number is used pre-fixed with a 1 to refer to like parts.

As can be seen in FIG. 9, the magnitudes of L and R for the balance means can be less than that for connecting rod 114. Nevertheless, in this embodiment the L/R ratio of the balance means connecting rod 126 and the piston connecting rod 114 are substantially equal.

Balance arms 130 comprise a massive end connected to balance means connecting rod 126. Their opposite end is rotatably connected to a fixed point on the engine. Beneficially, balance arms 130 can provide an inertia such that they produce a force equal and opposite to that generated by the piston 112.

In this embodiment, beneficially the balance means is kept clear of the oil sump reducing the possibility of oil foaming and associated drag. Also, the overall height of the engine may be reduced over the design shown in FIGS. 1 to 4.

Figure 10:
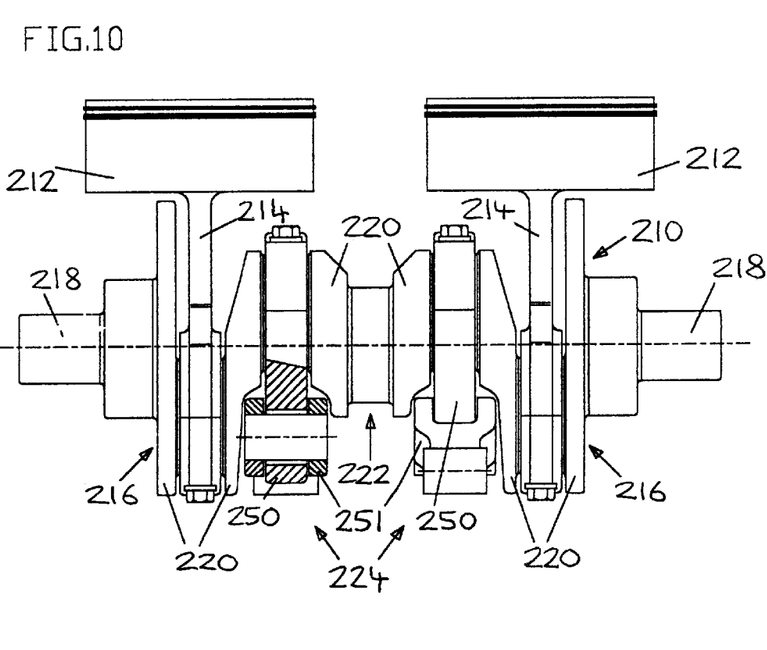
FIG. 10 is a side elevation view of a fourth embodiment of a crankshaft and twin-piston arrangement according to the invention.
Figure 11:
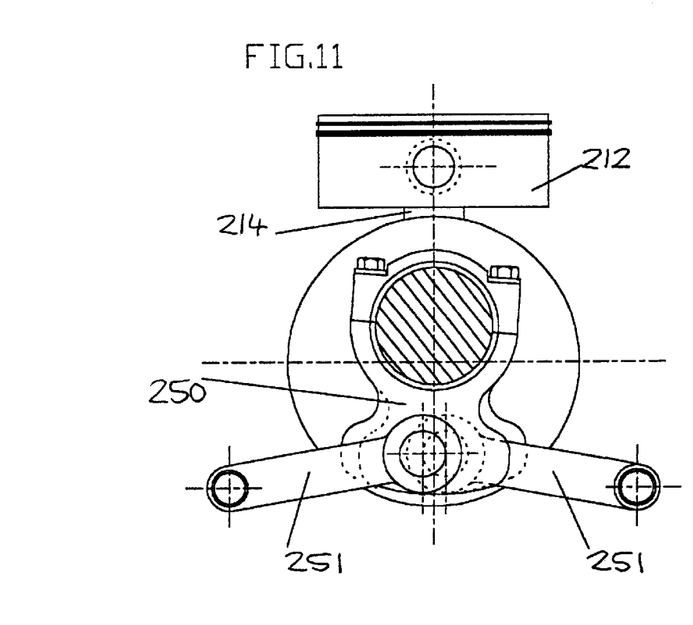
FIG. 11 is an end elevation view of the arrangement shown in FIG. 10.

A further embodiment of a twin-piston arrangement 210 according to the invention is shown in FIGS. 10 and 11. The arrangement uses substantially similar components to those described in earlier embodiments and accordingly, the same two digit reference number pre-fixed by the numeral two is used to denote previously described components. In his embodiment and the further embodiment shown in FIGS. 12 to 14, the balance means 224 and 324 comprises a balance mass 250 and 350 pivotally connected directly to a crankshaft web 220 and 320 respectively. The balance mass 250 or 350 is guided by a guide link 251 or 351 of relatively minimal mass, respectively in the two embodiments.

The balance masses 250 and 350 are separated by a main bearing 222 and 322. The balance masses can be formed using part of a normal connecting rod design to connect to the crankshaft but additionally comprising a portion of increased mass compared to connecting rod, as can be seen in FIG. 11. It has been found that without this extra main bearing the crankshaft flexes. This causes vibration and eventually catastrophic failure. Beneficially, then, the central main bearing reduces vibration and improves component durability. Additionally, the design of the two links 250 and 251 is free from the constraints described in GB 2057061.

Figure 12:
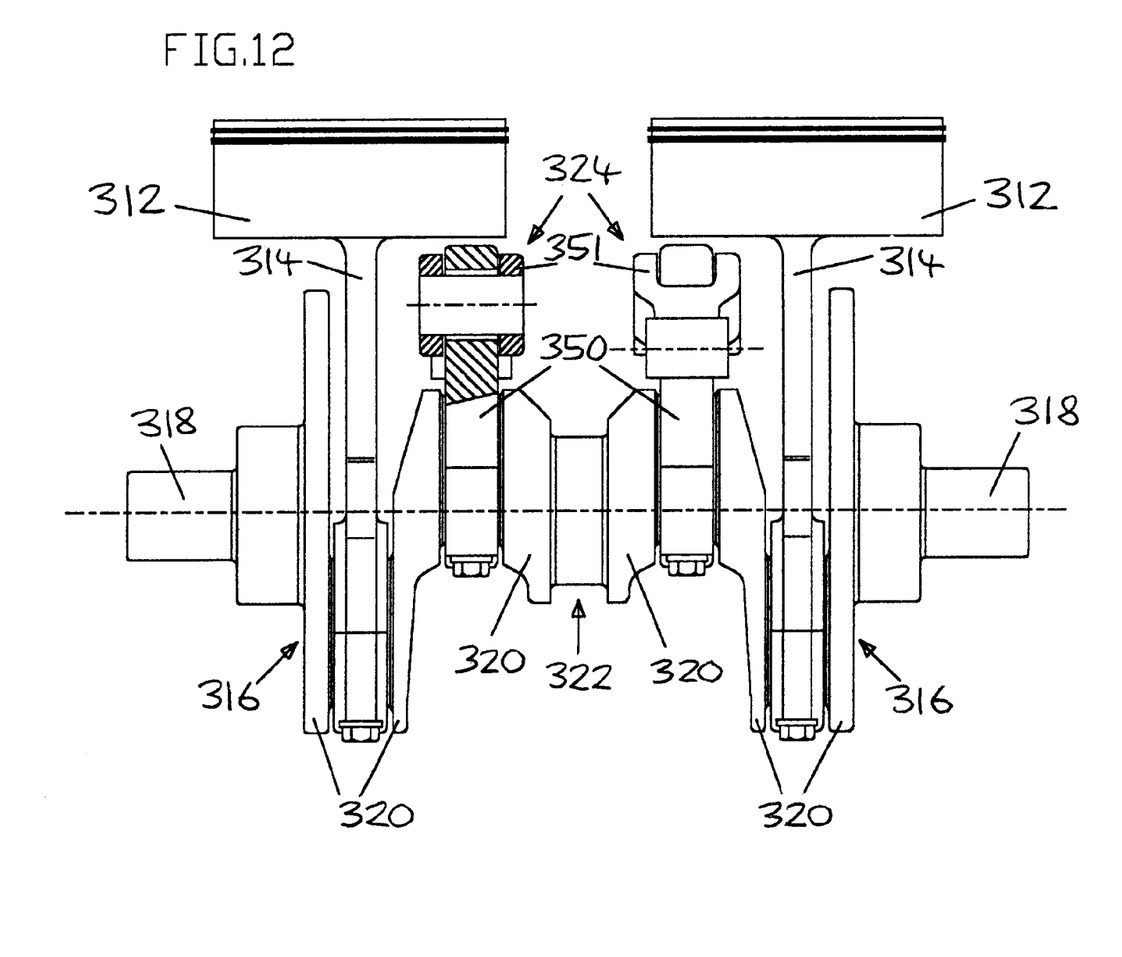
FIG. 12 is a side elevation view of a fifth embodiment of a crankshaft and twin piston arrangement according to the invention.
Figure 13:
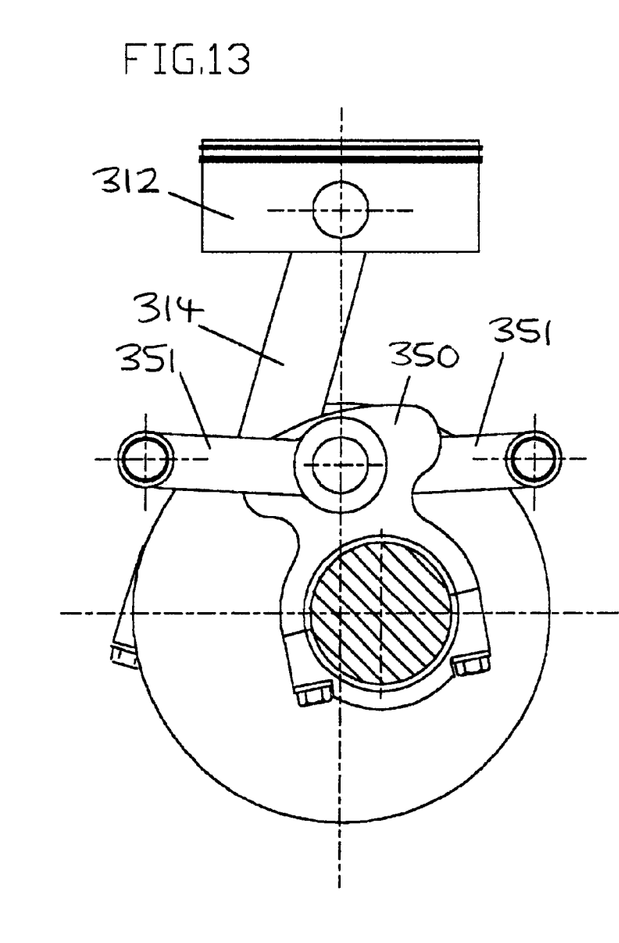
FIGS. 13 and 14 are end elevation views at different points in the stroke of the arrangement shown in FIG. 12.
Figure 14:
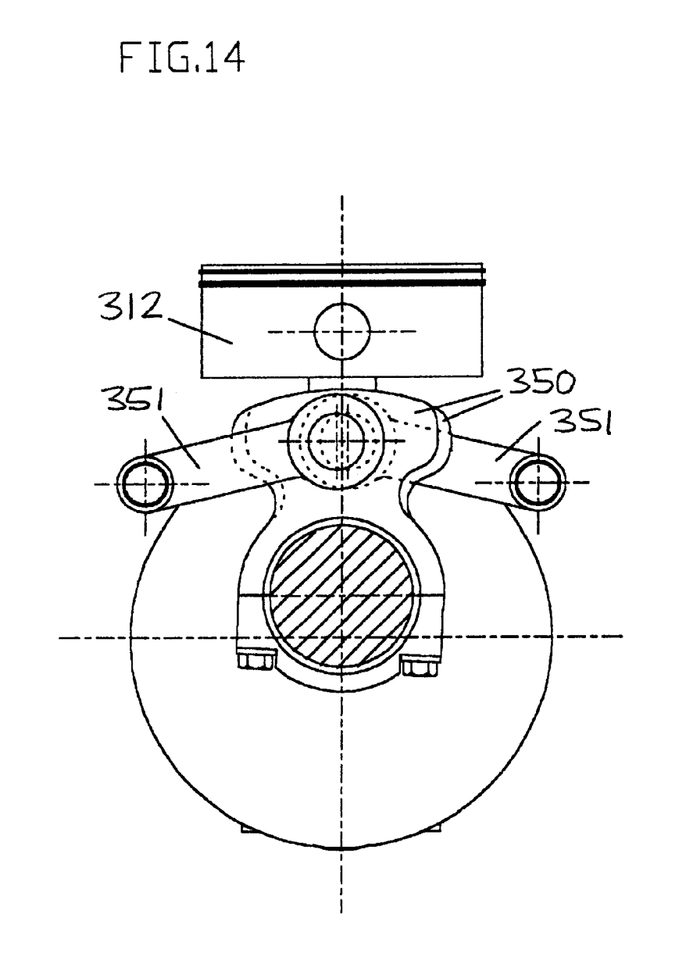

FIGS. 12, 13 and 14 show a yet further embodiment of the invention which is similar to that shown in FIGS. 10 and 11 except that the balance means 324 is positioned on the same side of the crankshaft 318 as the pistons 312 and connecting rods 314. Beneficially the balance means is kept clear from any oil sump thereby reducing oil aeration and drag. Additionally, the overall height of the engine may be reduced. The end of the balance mass 350 and the underside of piston 312 can be contoured to allow a certain length of mass 350 to be used whilst still maintaining clearance between the two, as can be seen in FIG. 14.

Of course, whilst single cylinder and twin-cylinder arrangements have been shown in the preferred embodiments, the designs can be adapted for use in any number of cylinders to provide some of the benefits discussed above. In such embodiments, the balance means described can be used a sole means for balancing the engine or in conjunction with known balance shafts.

Beneficially, dense materials such as tungsten may be used to enhance the balance arm to enable a relatively less massive arm overall. This is because a region of denser material can be positioned in the massive end to effect a large balancing force on the balance means connecting rod.

Figure 15:
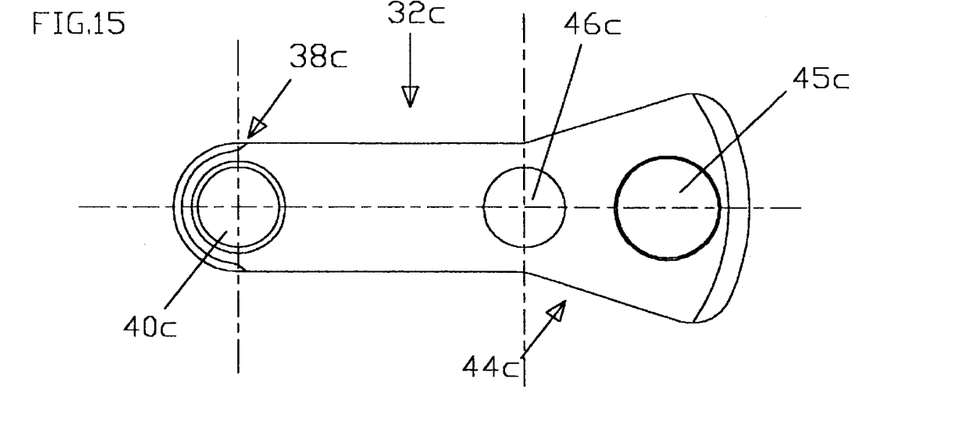
FIGS. 15, 16 and 17 are side, plan and sectional side elevation views of a balance arm according to the invention.
Figure 16:
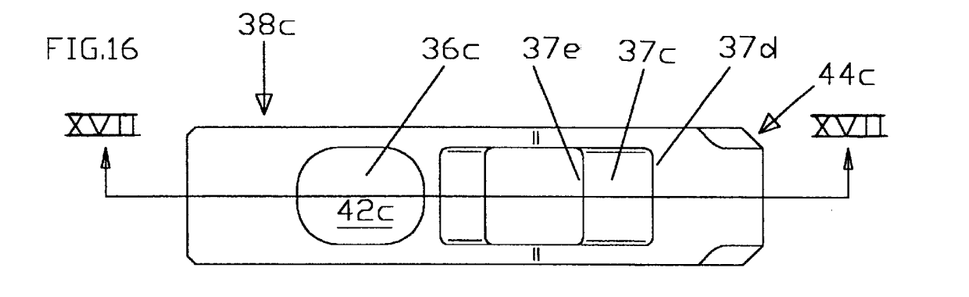
Figure 17:
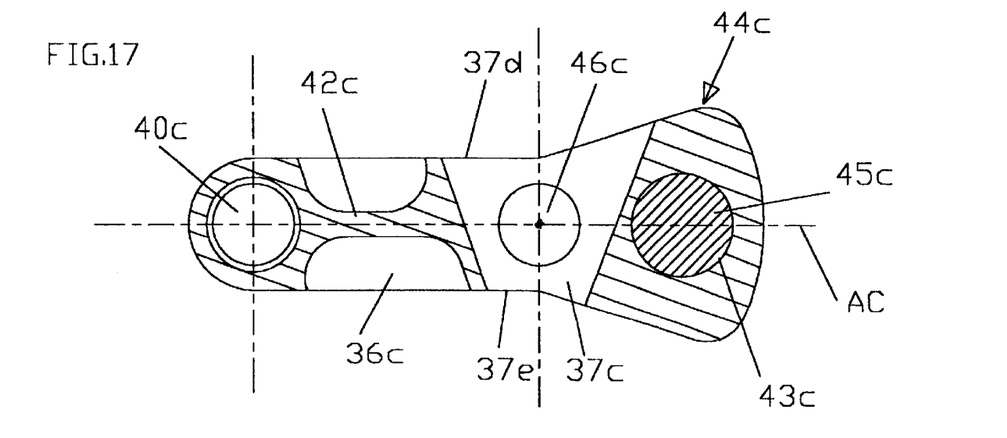

A particular arrangement is shown in FIGS. 15, 16 and 17 wherein the massive end 44c of the balance arm 32c comprises a region or plug 45c of material, eg tungsten, which is denser than the rest of the arm. This arrangement causes the centre of mass of the massive end to be disposed beyond the pivot axis through aperture 46c. The centre of mass of the whole balance arm is also moved along the longitudinal axis AC of the arm 32c and possibly beyond the pivot axis at the massive end. This result can be achieved by making the massive end asymmetrical in shape as shown. In this embodiment of arm 32c, a cylinder or plug 45c of dense material such as tungsten or lead for example, is inserted in an aperture 43c which passes through massive end 44c. A tight frictional hold can be exerted by the aperture rim on plug 45c. Alternatively, cooperating locking means such as a bolt and threaded aperture can be provided to secure plug 45c in position. Components in common with balance arm 32 shown in FIGS. 5 and 6 are of course labelled using the same two-digit reference number with the suffix 'c'. However, in this embodiment, in order to allow for the oscillatory movement of a connecting rod (26c not shown) pivoted on aperture 46c, a recess or aperture is provided. In this embodiment, an aperture 37c extends through arm 32c and is defined by a first rim 37d on one side and a second rim 37e on the other side of arm 32c. First rim 37d defines a greater aperture than smaller rim 37e. The throughbore 37c flares outwardly from rim 37e to 37d. This allows for the oscillatory motion of a connecting rod which passes beyond rim 37d up to a crank shaft.

In another preferred form the more massive material is provided as a bridge across the forked, massive end of a balance arm.

In another modification the minor end can comprise an extension such as an arm which extends away from the pivot to the engine. The extension can be used as an actuator providing oscillatory motion to drive a compressor or a pump (eg for water, oil or air for example).

In any of the two cylinder arrangements of the invention, the pistons can be out of phase by 180°, in other words a 180° parallel twin. The balance means for each piston would of course also therefore be 180° out of phase with one another.

What is claimed is:

1. A crankshaft and piston arrangement for a combustion engine, comprising a piston pivotally connected to a crankshaft by a connecting rod, and two balance means each comprising a balance means connecting rod connected to the crankshaft and a balance arm having a longitudinal axis and pivotally connected to the balance means connecting rod, the balance arm being pivotally connectable at an end remote from the balance means connecting rod to the engine and wherein the longitudinal axes of the balance arms extend in substantially opposite directions to one another and are substantially perpendicular to a plane through the crankshaft rotational axis (C) and centre of the piston when the piston is at substantially mid-stroke, and rotate in opposite directions to one another in use, and each balance means is substantially diametrically opposed to a piston with respect to the crankshaft rotational axis thereby operably to balance forces generated by the acceleration and deceleration of the piston in use, and the L/R ratios for the piston connecting rod and the balance means connecting rod are substantially equal, wherein the balance mass is substantially provided in the region of the balance means connecting rod thus to produce a force substantially equal in magnitude to the force generated by the motion of the piston.

2. A crankshaft and piston arrangement according to claim 1 wherein the piston connecting rod and balance means connecting rod are attached to the crankshaft about pivot axes (B and D respectively) which are symmetrically disposed with respect to the crankshaft longitudinal axis.

3. A crankshaft and piston arrangement according to claim 1 wherein at least one of the balance arms comprises an enlarged end which end is pivotally connected to one of the balance means connecting rods.

4. A crankshaft and piston arrangement according to claim 1, wherein the balance arms extend in substantially opposite directions to one another away from their respective connecting rods, the axes of the connecting rods are angularly displaced with respect to one another, and wherein the degree of angular displacement is less than or equal to 10° when the pistons are radially outermost.

5. A crankshaft and piston arrangement according to claim 4 wherein the degree of angular displacement is in the order of 3° when the pistons are radially outermost.

6. A crankshaft and piston arrangement according to claim 1 wherein when a piston is radially outermost, an angle is presented in the associated balance means between the central axis of the piston and the longitudinal axis of the balance arm which is not greater than 90°.

7. A crankshaft and piston arrangement according to claim 1 wherein when the piston is in a central position of the overall stroke of the piston, the balance arm presents substantially a right angle between the longitudinal axis of the balance arm and the axis between the balance arm pivot with the connecting rod and the centre of rotation of the crankshaft.

8. A crankshaft and piston arrangement according to claim 1 wherein the length of the balance means connecting rod is shorter than the piston connecting rod, and the connecting rod lengths and the stroke of the piston and balance means are such as to maintain a substantially equal L/R ratio for the balance means and piston connecting rods.

9. A crankshaft and piston arrangement according to claim 1 comprising two balance means each having a balance arm, which arms extend in substantially opposite directions to one another away from the crankshaft.

10. A crankshaft and piston arrangement according to claim 9 wherein a series of four crankshaft webs enable connection in series of a balance means, a piston connection rod and a second balance means to the crankshaft.

11. A crankshaft and piston arrangement according to claim 1 wherein when a piston is radially outermost, an angle is presented in the associated balance means between the central axis of the piston and the longitudinal axis of the balance arm which is greater than 45°.

12. A crankshaft and piston arrangement according to claim 1 wherein when a piston is radially outermost, an angle is presented in the associated balance means between the central axis of the piston and the longitudinal axis of the balance arm which is in the range of 50° to 75°.

13. A crankshaft and piston arrangement according to claim 1 wherein the connecting rod for the balance means is substantially identical to the connecting rod for the piston.

14. A crankshaft and piston arrangement according to claim 1 wherein the crankshaft comprises in axial order a first piston, two balance means and a second piston arranged along the crankshaft.

15. A crankshaft and piston arrangement according to claim 14 which comprises two parallel pistons each connected by a connecting rod and bearing to the crankshaft, a balance means for each piston wherein the balance arms extend in substantially opposite directions to one another away from their respective connecting rods wherein the connecting rods of the balance means share a co-axial axis of rotation on the crankshaft.

16. A crankshaft and piston arrangement for a combustion engine, comprising a piston pivotally connected to a crankshaft by a connecting rod, and balance means comprising a connecting rod and a balance arm pivotally connected thereto, the balance arm being connectable at an end remote from the balance means connecting rod to the engine and wherein the balance arm provides a balance mass, and the balance means is provided on the same side of the crankshaft as the piston.

17. A crankshaft and piston arrangement for a combustion engine, comprising a first piston pivotally connected to a crankshaft by a connecting rod, and a first balance means comprising a connecting rod and a balance arm pivotally connected thereto, the balance arm being connectable at an end remote from the balance means connecting rod to the engine and wherein the balance arm provides a balance mass, and the balance means is substantially diametrically opposed to the first piston and piston connecting rod, the crankshaft and piston arrangement further comprising a second piston and a second balance means, wherein the crankshaft comprises in axial order the first piston, the first and second balance means, and the second piston arranged along the crankshaft, wherein each of the pistons and balance means is separated from a neighboring piston and balance means by a crank web to which each is pivotally connected by a bearing.

18. A crankshaft and piston arrangement according to claim 17 wherein the massive end of the balance arm is forked such that the end of the balance means connecting rod is engaged between the massive forked end of the balance arm.

19. A crankshaft and piston arrangement according to claim 17 wherein the balance arm comprises a relatively massive end which end is pivotally connected to the balance means connecting rod and the centre of rotation of a pivot between the balance arm and balance means connecting rod is substantially centrally disposed in the massive end of the balance arm.

20. A crankshaft and piston arrangement for a combustion engine, comprising first and second parallel pistons each pivotally connected to a crankshaft by a connecting rod and bearing, and balance means for each piston and each comprising a connecting rod and a balance arm pivotally connected thereto, each balance arm being connectable at an end remote from its respective balance means connecting rod to the engine and wherein each balance arm provides a balance mass, and each balance means is substantially diametrically opposed to its respective piston and piston connecting rod, wherein the crankshaft comprises in axial order the first piston, two balance means and the second piston arranged along the crankshaft, wherein each of the pistons and balance means is separated from a neighboring piston and balance means by a crank web to which each is pivotally connected wherein the balance arms extend in substantially opposite directions to one another away from their respective connecting rods.

21. A crankshaft and piston arrangement for a combustion engine, comprising first and second pistons each pivotally connected to a crankshaft by a connecting rod, and first and second balance means each comprising a connecting rod and a balance arm pivotally connected thereto, each balance arm being connectable at an end remote from its respective balance means connecting rod to the engine and wherein each balance arm provides a balance mass, and each balance means is substantially diametrically opposed to a piston and piston connecting rod, said crankshaft and piston arrangement further comprising a central main bearing disposed centrally along the axis of the crankshaft substantially symmetrically between two pairs each comprising one of the pistons and one of the balance means.

22. A crankshaft and piston arrangement for combustion engines comprising two pistons each pivotally connected to a crankshaft by an associated connecting rod, and a pair of balance means comprising a guided balance mass to reduce the vibrations created by movement of the pistons in use, the crankshaft further comprising a central main bearing disposed axially between the two pistons and between a pair of balance means.

23. A crankshaft and piston arrangement according to claim 22 wherein balance means are connected on opposite sides of the central main bearing, and each balance means is in turn connected to crankshaft webs pivotally connected to piston connecting rods.

24. An engine having a crankshaft and piston arrangement for combustion engines comprising a piston pivotally connected to a crankshaft by a connecting rod and balance means comprising a balance mass pivotally connected to the crankshaft and a guide link pivotally connected to the balance mass and connectable at an end remote from the balance mass to a fixed point on the engine, wherein the guide link for the balance means is connected to the engine on the same side of the crankshaft as the piston and the balance means is disposed between the piston and crankshaft.

25. A crankshaft and piston arrangement for a combustion engine, comprising a piston pivotally connected to a crankshaft by a connecting rod and balance means comprising a connecting rod and a balance arm pivotally connected to the balance means connecting rod, the balance arm being connectable at an end remote from the balance means connecting rod to the engine, and wherein the balance arm provides a balance mass and the balance means is provided on the same side of the crankshaft as the piston, wherein when a piston is radially outermost, an angle is presented in the associated balance means between the central axis of the piston and the longitudinal axis of the balance arm which is in the range of 50°–75°.

26. A crankshaft and piston arrangement for a combustion engine comprising a piston pivotally connected to a crankshaft by a connecting rod and balance means comprising a connecting rod and a balance arm pivotally connected to the balance means connecting rod, the balance arm being connectable at an end remote from the balance means connecting rod to the engine, and wherein the balance arm provides a balance mass and the balance means is provided on the same side of the crankshaft as the piston, said crankshaft and piston arrangement comprising two parallel pistons each connected by a connecting rod and bearing to the crankshaft and a balance means for each piston, wherein the balance arms extend in substantially opposite directions to one another away from their respective connecting rods, the axes of the connecting rods are angularly displaced with respect to one another, wherein the degree of angular displacement is in the order of 3° when the pistons are radially outermost.

27. A crankshaft and piston arrangement for a combustion engine, comprising a piston pivotally connected to a crankshaft by a connecting rod and balance means comprising a connecting rod and a balance arm pivotally connected to the balance means connecting rod, the balance arm being connectable at an end remote from the balance means connecting rod to the engine, and wherein the balance arm provides a balance mass and the balance means is provided on the same side of the crankshaft as the piston, wherein when a piston is radially outermost, an angle is presented in the associated balance means between the central axis of the piston and the longitudinal axis of the balance arm which is in the order of 90°.

28. A crankshaft and piston arrangement for a combustion engine, comprising a piston pivotally connected to a crankshaft by a connecting rod and balance means comprising a connecting rod and a balance arm pivotally connected thereto, the balance arm being connectable at an end remote from the balance means connecting rod to the engine and wherein the balance arm provides a balance mass and the balance means is provided on the same side of the crankshaft as the piston.

29. A crankshaft and piston arrangement according to claim 28 wherein the connecting rod for the balance means is substantially identical to the connecting rod for the piston.

30. A crankshaft and piston arrangement according to claim 29 wherein each of the pistons and balance means is separated from a neighboring piston and balance means by a crank web to which each is pivotally connected by a bearing.

31. A crankshaft and piston arrangement according to claim 28 wherein the balance arm comprises a relatively massive end which end is pivotally connected to the balance means connecting rod.

32. A crankshaft and piston arrangement according to claim 31 wherein the massive end of the balance arm is forked such that the end of the balance means connecting rod is engaged between the massive forked end of the balance arm.

33. A crankshaft and piston arrangement according to claim 31 wherein the centre of rotation of the pivot between the balance arm and balance means connecting rod is substantially centrally disposed in the massive end of the balance arm.

34. A crankshaft and piston arrangement according to claim 28 which comprises two parallel pistons each connected by a connecting rod and bearing to the crankshaft, a balance means for each piston, wherein the balance arms extend in substantially opposite directions to one another away from their respective connecting rods, the axes of the connecting rods are angularly displaced with respect to one another, wherein the degree of angular displacement is less than or equal to 10° when the pistons are radially outermost.

35. A crankshaft and piston arrangement according to claim 28 wherein when the piston is in a central position of the overall stroke of the piston, the balance arm one of a) is horizontal, or b) presents substantially a right angle between the balance arm pivot with the connecting rod and the centre of rotation of the crankshaft.

36. A crankshaft and piston arrangement according to claim 28 wherein the length of the balance means connecting rod is shorter than the piston connecting rod, and the connecting rod lengths and the stroke of the piston and balance means are such as to maintain a substantially equal L/R ratio for the balance means and piston connecting rods.

37. A crankshaft and piston arrangement according to claim 28 comprising two balance means each having a balance arm, which arms extend in substantially opposite directions to one another away from the crankshaft.

38. A crankshaft and piston arrangement according to claim 37 wherein a series of four crankshaft webs enable connection in series of a balance means, a piston connection rod and a second balance means to the crankshaft.

39. A crankshaft and piston arrangement according to claim 28 wherein the crankshaft comprises in axial order a first piston, two balance means and a second piston arranged along the crankshaft.

40. A crankshaft and piston arrangement according to claim 39 which comprises two parallel pistons each connected by a connecting rod and bearing to the crankshaft, a balance means for each piston wherein the balance arms extend in substantially opposite directions to one another away from their respective connecting rods, and the connecting rods of the balance means for the twin piston engine share a co-axial axis of rotation on the crankshaft.

41. A crankshaft and piston arrangement according to claim 28 comprising a central main bearing disposed centrally along the axis of the crankshaft substantially symmetrically between two pairs each comprising one of the pistons and one of the balance means.

42. A crankshaft and piston arrangement according to claim 28 wherein when a piston is radially outermost, an angle is presented in the associated balance means between the central axis of the piston and the longitudinal axis of the balance arm which is less than 90°.

43. A crankshaft and piston arrangement according to claim 28 wherein when a piston is radially outermost, an angle is presented in the associated balance means between the central axis of the piston and the longitudinal axis of the balance arm which is greater than 45°.

* * * * *